April 1, 1969     T. W. SIMPSON     3,436,229
METHOD OF COOKING POTATO CHIPS TO INCREASE FLUFFINESS
AND PREVENT BROWNING
Filed April 27, 1967

INVENTOR.
THOMAS W. SIMPSON
BY
McNENNY, FARRINGTON, PEARNE & GORDON
ATTORNEYS

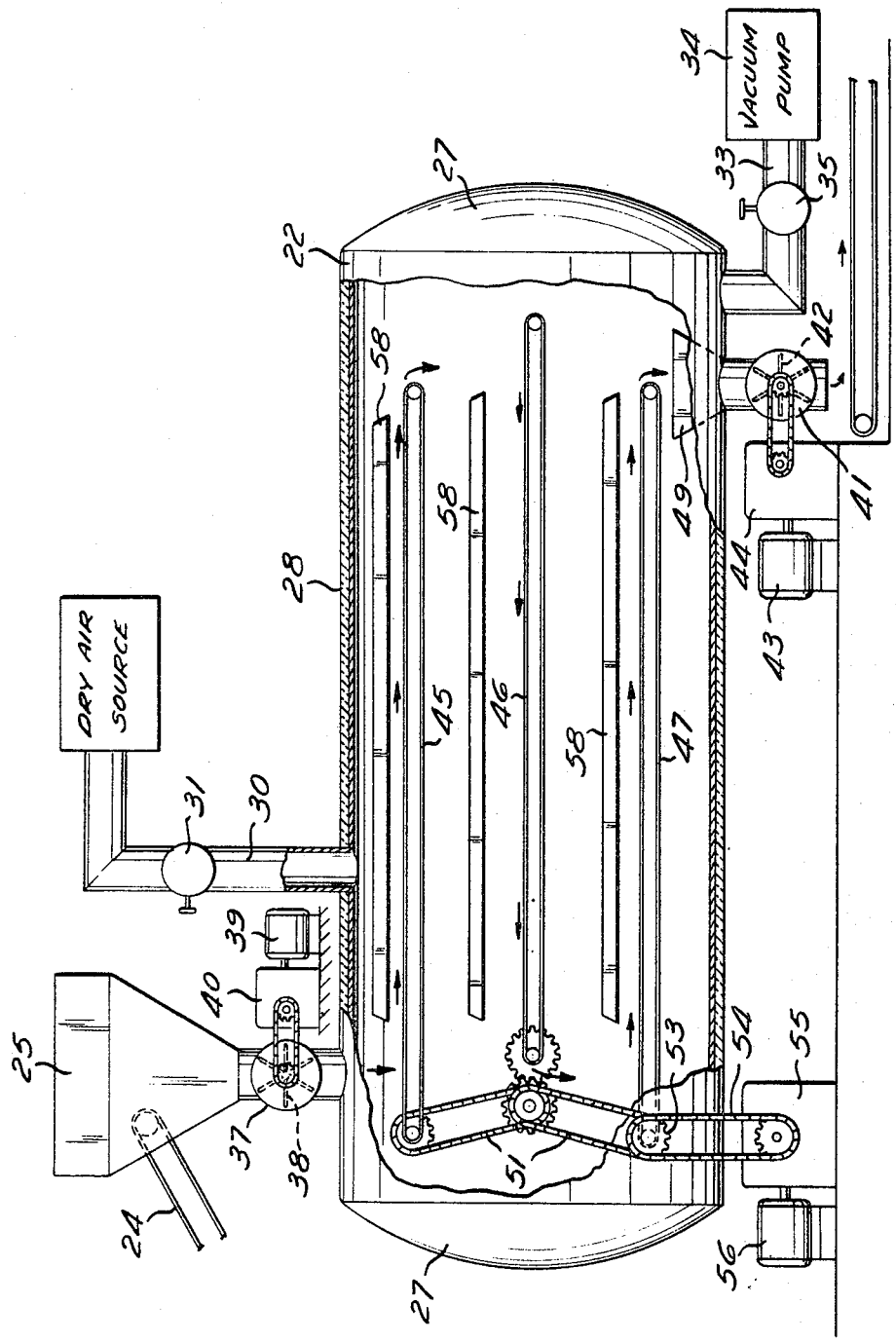

United States Patent Office 3,436,229
Patented Apr. 1, 1969

3,436,229
METHOD OF COOKING POTATO CHIPS TO INCREASE FLUFFINESS AND PREVENT BROWNING
Thomas W. Simpson, Harrisburg, Pa., assignor to J. D. Ferry Co., Inc., Harrisburg, Pa., a corporation of Delaware
Continuation-in-part of application Ser. No. 526,438, May 4, 1966. This application Apr. 27, 1967, Ser. No. 634,273
Int. Cl. A23l *1/12*
U.S. Cl. 99—100     5 Claims

ABSTRACT OF THE DISCLOSURE

A process for continuously cooking potato chips in which the chips are removed from the cooking oil with a moisture content greater than desired in the finished product. After removal from the oil, the chips are transferred into a chamber having an atmosphere of controlled dryness and temperature at a pressure below atmospheric pressure, and the chips are dried within this chamber to the desired moisture content of the finished product.

---

This application is in part a continuation of my copending application Ser. No. 526,438, filed May 4, 1966 and now abandoned.

Background of the invention

This invention relates generally to potato food products and more particularly to the cooking of potato products, such as potato chips and crisps, which have a very low amount of residual moisture.

Potato chips are usually prepared by first peeling the potatoes, then slicing them into slices of the desired thickness, generally between .050 and .070 inch, and then washing them in water to remove the free starch produced by the rupture of some of the cells during the cutting action. The washed slices are then immersed in a suitable heated vegetable oil, such as cottonseed oil, soybean oil, corn oil, peanut oil, and the like. The oil is normally heated to a temperature between 325° and 375° F., with the initial temperature preferably about 350° F. and the finished temperature, since the oil is cooled by the driving off of the water from the potato, about 325° F. If the potatoes are of proper quality, the desired product then has a very light color without brown spots and a residual moisture of not more than 2% to give the chip the desired crispness. Under these conditions, the absorption and adherence of the oil result in about 30% to 50% by weight of the finished chip being the vegetable oil used in the cooking process. However, it is not always possible to obtain a potato chip of the desired color and texture because of the variation in the nature of the potatoes and the condition under which they are stored prior to the cooking operation.

When potatoes are stored at a relatively high temperature, they have a tendency to begin to sprout and the resulting sprout growth utilizes the cellular material of the potato in providing this growth. Since such growth causes rapid deterioration of the potato, it has been customary to store potatoes at a lower temperature, which diminishes sprout growth, so that they may be stored for longer periods of time as required before use. However, when potatoes are stored at a lower temperature, the metabolism of the potato results in a breakdown of the starch and the production of sugars, such as glucose, which remain within the potato and build up in concentration, whereas, when potatoes are stored at a higher temperature, the glucose is consumed and remains at a relatively low level.

It has been recognized that the formation of glucose in the potato is the source of a particular problem in the cooking process when the reducing sugar content is greater than 0.4% by weight. The glucose in combination with various protein compounds allows an enzymatic browning or "Maillard" reaction to take place at the end of cooking, which gives the chips a dark appearance and a somewhat burned or bitter taste, and which makes them undesirable for marketing purposes. While this problem can be avoided by storing the potatoes at a temperature of about 65° to 70° F. for several weeks, this procedure does not allow economical handling and storage of the potatoes. Therefore, most efforts to solve this browning problem have been directed to providing processes for utilizing potatoes having a moderate sugar content, and have been based on the principle that the reaction does not take place to any substantial extent before the end of the cooking time as the water content is being reduced to the minium level. Thus, it has been recognized that with potatoes having a moderate glucose content, the browning which results from the presence of this glucose during the final cooking stages can be avoided if the chips are removed from the cooking oil before they reach the desired low moisture level. However, this creates the problem that it is still necessary to remove the excess moisture in some efficient and rapid manner so that the potato chip has the proper crispness and texture.

The problem has been compounded by the fact that the cooking operation performs two separate and distinct functions. On the one hand, the heat of the cooking produces the necessary changes in the structure and composition of the potato which result in the distinctive taste and the normal golden appearance produced by the cooking of the starch and the other constituents of the cell structure. On the other hand, the cooking is also necessary to reduce the moisture content from the original level of between 74% and 86% of the fresh potato. Thus, it has been found necessary to cook potatoes at a relatively high temperature in the oil in excess of 300° F. to produce the proper cooking action to give the desired texture and golden color, and efforts to cook potato chips at any substantially lower temperature do not produce a satisfactory product. This is true both because of the lack of the necessary cooking action and the long time required to remove the moisture, and because the nature of the cooking operation which takes place at such lower temperatures results in a greatly increased oil absorption by the potato above the maximum for a quality product. For this reason, it has been recognized that it is not possible to alter the cooking temperature of the oil, and the cooking process must be the same for all types of potatoes, whether for fresh ones having no noticeable sugar content or those having a high glucose content resulting from long term storage at low temperatures.

Prior art

It has been recognized in Patent No. 2,611,705, issued Sept. 23, 1952 to Carl E. Hendel, that the browning action can be prevented by removing the chips from the cooking oil after they have reached the desired color and before all of the moisture has been removed and before any browning has started, after which the chips are completely dried by exposure to dry air. This process has been employed successfully where potato chips have a relatively low sugar content not exceeding about 0.5% of the total solid matter, and where only one or two percent of the moisture need be removed by the air drying. However, using this process with potatoes having a higher sugar or moisture content than that mentioned does not produce satisfactory results. One problem is that the more moisture that must be removed from the chips, the longer they must be exposed to the heated air, and this tends to create an undesirable change in flavor if continued for the necessary length of time. Efforts to shorten the length of time by increasing the temperature of the air have also created the problem that if the chips become too hot, the Maillard reaction continues and causes a certain amount of browning anyway.

It has also been proposed to treat the chips by means of radiant energy to remove the remaining water very quickly after they are removed from the cooking oil. However, this process has not been successful because the radiant heat initially heats the outer surfaces of the chip, tending to bring the oil to the surface and creating a glazing action which makes the chip too hard and brittle, as well as giving it a greasy feel beyond that resulting from the normal oil content of the chip.

Another method has been to use microwave ovens for heating the potatoes after they have been removed from the oil. The microwave heating avoids the problems of radiant heating so that the oil is not brought to the surface, since the heating of the chip takes place from the inside out. However, such microwave installations are extremely expensive to install, and in operation they consume large amounts of power and have a low rate of efficiency, so that their use has been limited to the removal of a maximum of only 3% to 4% of moisture from the chip after it has been removed from the cooking oil. When microwave processes are used with chips requiring a greater amount of moisture removal, the excessive cooking of the chip in the interior at the high moisture level existing in that zone gives the finished chips a "baked" taste which is undesirable.

Likewise, efforts to use extended air drying at a relatively low temperature suffer from the problem that the excessive exposure to air at any elevated temperature for a long period of time causes a loss in flavor and gives a rather tough texture which is undesirable.

Thus, prior art efforts to utilize potatoes having a more than minimal sugar content, while avoiding the browning produced by the Maillard reaction, have been limited to utilizing potatoes with a maximum sugar content of about .5% of the solid matter by weight; and prior art methods of utilizing potatoes having a higher sugar content have resulted either in the brown spots because of the Maillard reaction or in a potato chip which is otherwise undesirable because of the undesirable qualities imparted to the chip during the final drying process.

Summary of the invention

In the process of the present invention, the potato chips are sliced and washed and introduced into the cooking oil in a standard frying machine in the usual manner. However, the chips are removed from the oil before they reach their final desired dryness of not more than two percent moisture. Thus, the chips are removed while they have a moisture in excess of 2% but less than about 15% so that they have a substantial degree of crispness to retain their shape and have reached the desired golden color. When the chips reach the desired moisture level, they are removed from the cooking oil in the usual manner and may be salted at this time. However, as soon as possible and before they have cooled any substantial amount in the open air, the chips are transferred into a chamber which is provided with a specially controlled atmosphere. This atmosphere has a pressure reduced below the external atmospheric pressure, and is maintained at a generally low humidity by introducing dry air in a controlled manner. The temperature is generally maintained at a level at which the Maillard reaction does not occur or about 150° F. or not more than 180° F., and the chips are exposed to this controlled atmosphere within the vessel until they reach the desired degree of dryness of less than 2% retained moisture.

When the chips are removed from the cooking oil and dried to completion in the controlled atmosphere, it is found that a greatly superior product results. While this process allows the production of highly satisfactory chips from potatoes which have been stored in such a manner as to develop a substantial sugar content, the process is also useful with fresh potatoes having substantially no sugar content to produce a product having a greatly improved texture and "bite," as well as increased shelf life.

With the present invention, the problems unsolved by the prior art have been overcome, and a high quality chip can be produced from potatoes having a high sugar content. Because the potatoes are dried under a low humidity atmosphere, the drying takes place at a rapid rate so that the moisture is removed rapidly. The temperature is maintained at a temperature below that at which the Maillard reaction can take place so that, regardless of the length of exposure of the chips in the atmosphere and regardless of their sugar content, no enzymatic browning can take place. Moreover, the reduction in atmospheric pressure not only results in a further shortened period of drying time, but, because of the lower pressure, the partial pressure of the oxygen is less so that any oxidation effect on the chips is reduced even further.

Another feature of the invention is the improved "bite" and quality of the chips as a result of the fluffiness or slightly increased bulk and softer texture which result from the vacuum drying. It is believed that this change results because the lower pressure causes a more controlled release of the moisture before the chip is completely dry, so that, while the cell walls of the potato still retain a moderate degree of elasticity, they are ruptured by the evaporation of the moisture. This distends the cell walls before the final drying and hardening of the cell walls take place to increase the thickness of the chip and reduce the hardness of the structure to give a somewhat softer "bite" and fluffier texture while retaining the desired degree of crispness.

Another advantage of drying chips by this process is the reduced oil content of the chips. Because they are removed from the oil while still retaining a moderate amount of moisture, they have not absorbed the full amount of oil, and upon completion of the process, the chip has a lower percentage of oil in the range of 25 to 30%. Because the oil remains within the chip and is not driven to the surface by the vacuum drying, the chip maintains the desired texture and crispness without any excessive surface oil which would give an oily or greasy feel to the chip.

It has also been found that potato chips processed in accordance with the present invention have a greatly increased shelf life because of a decreased tendency for the oil to become rancid. It is believed that this increased shelf life results from the fact that when the chips are removed from the oil with a substantial moisture content of at least 5%, there has been considerably less deterioration of the retained oil so that no substantial change in the peroxide value takes place in the oil retained in the completed chips for a considerably longer period of time than normally results when the chips are cooked in the oil to the desired degree of dryness.

According to another feature of this invention, it has been found possible to produce a highly satisfactory product from potatoes having a sugar content as high as 2½% to 3% of the total amount of dry matter, while avoiding the undesirable Maillard browning action and deterioration in the quality of the finished product. This is possible because the greatly improved drying action obtained under vacuum allows removal of the remaining moisture at a low temperature at such a rapid rate that large amounts of moisture up to about 15% can be removed before any noticeable deterioration takes place.

While the foregoing features and advantages of this invention are indicative of the superior results obtained with the process and apparatus of the present invention, it is well understood that additional advantages and features will become apparent to those skilled in the art upon a more complete understanding of the invention as set forth in the following detailed description taken in conjunction with the accompanying drawings.

Brief description of the drawings

FIGURE 2 is an enlarged elevational view, partially in section, of the controlled atmosphere chamber utilized for the final drying process.

Description of the preferred embodiment

Figure 1:
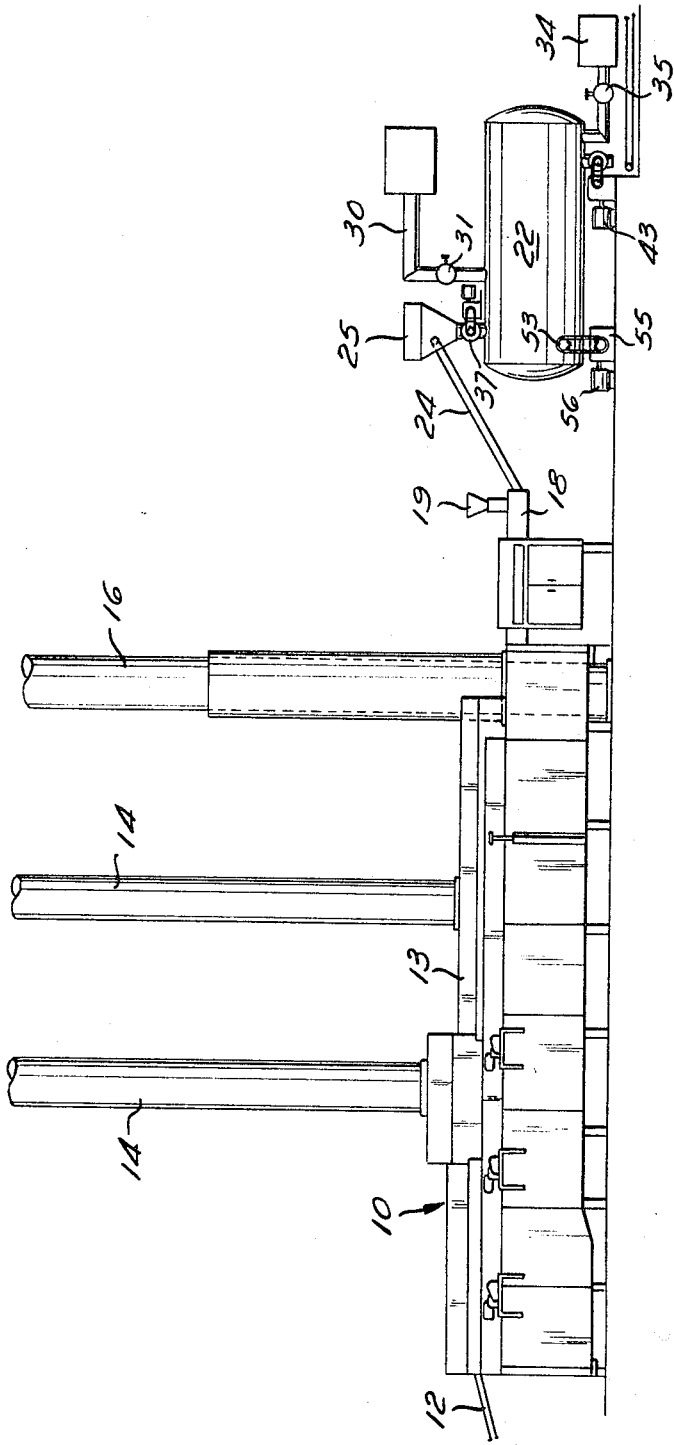
FIGURE 1 is a schematic elevational view of a potato chip cooking machine according to the present invention.

Referring now to the figures in greater detail, FIGURE 1 shows a potato chip cooking machine of the type well known in the art arranged so that the output from the machine is fed to a tank or chamber in which the final drying is carried out. The cooker 10 includes an elongated cooking kettle (not shown) filled with the heated vegetable oil in which the chips are cooked. The slices of raw potato are fed into the cooker by the in-feed belt 12 in the form of an endless conveyor from the machinery for peeling, slicing and washing the potatoes. The cooking takes place within the kettle, which is covered by the hood 13 and within which are provided suitable mechanisms for moving the chips throughout the length of the cooker in a given period of time so as to insure substantially uniform time of exposure to the cooking oil. Suitable stacks 14 are provided for removing the steam, and a furnace stack 16 is provided for the heater which usually lies in the bottom part of the machine for maintaining the oil at the desired temperature.

After the chips have been in the cooker for the desired period of time, they are removed from the oil and passed into a drain section 18 where the excess oil is removed. The chips then pass through the salter 19 where they receive a light coating of granulated salt and then are conveyed by a belt 24 into a hopper 25 mounted on top of one end of the processing tank or chamber 22.

The tank 22 may be of any convenient shape, but conveniently is in the form of a cylinder with rounded ends 27 so as to be able to resist a pressure of at least one atmosphere in the event that a substantially complete vacuum is created inside the tank. In order to minimize heat losses, the outside of the tank is covered with a layer of suitable insulation, as indicated at 28, and the interior is provided with dry air through a conduit 30, the rate of flow of which is controlled by a suitable valve 31. Likewise, an outlet conduit 33 is connected to a vacuum pump 34 and is provided with a valve 35 for regulating the rate of air removal from the interior of the tank. Thus, by operation of the valves 31 and 35, it is possible to obtain a very close regulation of the pressure, temperature and humidity of the atmosphere within the tank 22.

Because the tank 22 operates at a pressure less than atmospheric, it is necessary to provide special means for introducing the potato chips into the interior of the tank and for removing them therefrom with minimum air leakage. As shown, the hopper 25 leads into an inlet lock 37, which may be of the rotary type, having rotary vanes 38 driven in a controlled manner by a variable speed motor 39 and gearbox 40. Likewise, the chips are removed from the chamber through an outlet lock 41 at the bottom of the other end of the tank, with the lock likewise having rotary vanes 42 driven at a controlled rate by the variable speed motor 43 and gearbox 44. With this type of lock, the rotary vanes form a continuous seal with the housing and thereby admit a minimum amount of air with the potato chips as the space between the vanes passes between the atmosphere and the interior of the tank. Because there is a small continuous admission of air in both the inlet and outlet air locks, this amount of air must be taken into consideration in the operation and regulation of the vacuum pump 34 and valve 35. However, it is possible to use other types of inlet locks such as flap valves and the like, which can be made more efficient and introduce less air with a given amount of material. Of course, the exact construction of the locks is not important and any suitable arrangement can be used in carrying out this invention.

In order to provide controlled movement for the chips within the tank 22, suitable conveyors are provided as the three conveyors 45, 46 and 47 operating in consecutively opposite directions. These conveyors may be of the open mesh type for maximum exposure of the chips and, as shown, the chips come from the inlet lock 37 onto one end of the top conveyor 45 and travel for its full length and are then discharged onto the middle conveyor 46. The chips then are passed onto the other end of the bottom conveyor 47 and travel to the end of this conveyor and fall into a hopper 49 for the outlet lock 41. A suitable chain drive 51 is utilized for driving all of the conveyors 45, 46, and 47 together at a uniform speed to obtain proper coordination of movement, and the conveyors are preferably driven by having an exposed sprocket 53 extend outward of the housing where it is connected by a chain 54 to a gear reducer 55 driven by a variable speed motor 56. By regulating the speed of the motor 56 or the ratio of the reducer 55, the speed of the conveyors can be regulated so as to maintain the chips exposed to the atmosphere within the tank 22 for the desired period of time. If it is found necessary to add additional heat to the interior of the tank 22, that is, heat in excess of that supplied by the chips themselves, suitable heaters 58 may be provided generally for heating the air and not the chips, since, as previously stated, it is undesirable to expose the chips to radiant heat because it tends to bring the oil to the surface. Thus, the heaters 58 function to warm the air and the walls of the tank and the conveyors rather than heating the chips directly. After leaving the outlet lock 41, the chips have cooled sufficiently that they may be packaged wihout further delay.

In utilizing potatoes which have acquired a noticeable content of reducing sugars, it is necessary to check the actual sugar content of the potatoes, and this may be done either by testing the wash water of the slices or by various tests that may be performed directly on sample slices or a cut potato. These tests may be made by any of the well known methods for testing for the presence of reducing sugars such as glucose, or by test paper which is wetted by the potato and then compared on a chart to give direct readings of the sugar content. In each case, these tests give a reading for the percent of sugar in the entire potato, including both the solid portion and the water.

It is also necessary at this time to determine the amount or percent of solids in the potato. This is easily accomplished by measuring the specific gravity of the potato and then using any of the well known charts for directly determining the percentage of solids. After the sugar content and percent of solids have been determined, then it is possible to determine directly the important information for this process, which is the sugar expressed as percent of the total solids of the potato. This may be determined by the following formula:

$$\frac{100 \times X}{Y} = Z \qquad (1)$$

in which X is the sugar content as a percentage of the entire potato, Y is the percent of dry matter or solids in the potato, and Z is then the sugar content as a percentage of the total solids.

According to this invention, it has been found possible to utilize potatoes having a relatively high sugar content, that is, in excess of 0.4% by weight in terms of potato solids and as high as 2.5%. While it is possible to utilize potatoes having an even higher sugar content than this and still avoid the enzymatic browning from the Maillard reaction, it is found from a practical aspect that potatoes which have been stored under such conditions and for such a period of time as to achieve a higher sugar content have undergone such deterioration in cell structure as not to produce a good quality chip, and that a higher sugar content, since the sugar remains in the finished chip, has an adverse effect on the flavor of the chip even in the absence of any browning.

The browning can be avoided if the chips are removed from the cooking oil before they have reached the desired dryness of less than 2% moisture. The relationship that has been found between the amount of moisture remaining when they are removed and the sugar content is such that the following relationship holds:

$$\frac{Z \times 100}{M} \text{ shall not exceed } 30\% \quad (2)$$

where M is the moisture content of the chip when it is removed from the oil. The 30% limit is the greatest amount of dryness that can be reached while leaving a reasonable safety factor, and, in general, it is preferred to remove them from the heated cooking oil at a higher moisture content so that the ratio expressed in Equation 2 is between 20 and 25%. When potato chips are removed from the oil with a remaining moisture content substantially above 2% and then dried in a vacuum substantially lower than atmospheric pressure, the resulting chips have a fluffier texture and slightly increased thickness which make a more desirable product. Because this change results from the vacuum drying, it is also applicable to fresh potatoes having substantially no sugar content as well as those which are removed from the oil before final dryness to prevent enzymatic browning. This occurs because the cell structure with this remaining moisture is still somewhat elastic and the reduction in pressure causes some rupture of the cell structure which gives the finished chip a fluffier texture, making it somewhat softer while retaining the same high degree of crispness. It should be noted, however, that in general the chip should not be removed if the moisture content is above 15% because it is still somewhat in a plastic state and has not achieved the desired crispness from the cooking in the oil.

After the chips have been removed from the kettle at the desired moisture content, they are then transferred to the interior of the tank 22 in the manner mentioned before. Since it is generally desirable to have the final drying in the tank 22 take place as rapidly as possible, the process is carried out below the temperature of the Maillard reaction so that the method should be utilizing sufficient heat to maintain the temperature within the tank at 160° F., since the enzymatic browning action does not take place at this temperature. While somewhat higher temperatures can be used, they may be difficult to control, since the enzymatic browning of the Maillard reaction may begin to operate if the chips are exposed to temperatures above 200° F. Thus, it is generally desirable to utilize an operating temperature of 160° F., although temperatures as high as 180° F., and, of course, lower temperatures, may be utilized, depending upon the degree of temperature control which is maintained.

Likewise, the amount of vacuum within the chamber may be varied, but generally should be in excess of 4 inches Hg vacuum which pressure is less than atmospheric pressure and at which noticeable increased fluffiness of the chip appears in order to obtain the fluffiness which is imported to the chips by this process. Higher amounts of vacuum will produce more rapid drying, but since they require a greatly increased volume for the vacuum pumps, it is desirable to operate with a vacuum of less than 16 inches Hg unless the moisture content to be removed is extremly high.

TABLE I

| | | Average percent water left in chips removed from fryer | | | | |
|---|---|---|---|---|---|---|
| | | 15.5 | 13 | 10 | 8.5 | 5 |
| Time to dry in minutes to average 2% residual moisture. | At 160° F. and 16″ Hg. | 12.2 | 11.0 | 9.4 | 8.8 | 6.8 |
| | At 160° F. and 8″ Hg. | 17.2 | 15.8 | 14.5 | 12.7 | 10.0 |
| | At 160° F. and atmos. pressure. | | 22.8 | 20.2 | 18.1 | 14.8 |

Table I shows the examples utilizing potatoes of the same type showing the effects of variation of amount of vacuum and the time required to reduce the moisture content to 2% for different levels of moisture in the chips as removed from the oil. In the example where the moisture content was 15.5% and atmospheric pressure was used, the drying period was so long as to result in an unsatisfactory chip.

While the invention has been described with respect to certain apparatus and examples, it is recognized that the invention is not limited by such description but is defined by the following claims.

What is claimed is:

1. A method of cooking potato chips from potatoes having a reducing sugar content of greater than 0.4% weight to prevent browning comprising the steps of first cooking the chips in a heated oil at potato frying temperature to cook the chips and remove a portion of the moisture therefrom, removing the chips from said heated oil when said cooking is nearly finished such that the chips are removed before the relationship: sugar content of the chips × 100/amount of moisture in the chips exceeds 30 percent and such that the moisture content is greater than that desired in the finished product, and thereafter further reducing the moisture level by drying the product in dry air at a pressure less than atmospheric pressure at which noticeable increased fluffiness of the chip appears.

2. A process of cooking potato chips as set forth in claim 1 wherein the temperature for final drying is about 150° F. such that the Maillard reaction does not occur.

3. A process of cooking potato chips having a reducing sugar content greater than 0.4% by weight comprising the steps of cooking the potato chips in vegetable oil heated at potato frying temperature for a period of time sufficient to complete the cooking process and reduce the moisture content therein, removing the potato chips from the oil with a remaining moisture content in excess of 2%, transferring the potato chips directly to a vacuum chamber and thereafter drying the chips in said vacuum chamber at a pressure below atmospheric pressure sufficient to induce fluffiness of the chips to further reduce the moisture content of the potato chips.

4. A process of cooking potato chips as set forth in claim 3 wherein the air in said vacuum chamber is maintained at an elevated temperature at about 150° F. such that the Maillard reaction does not occur.

5. A process of cooking potato chips from potatoes having a reducing sugar content greater than 0.4% by weight of the solid matter of the potato comprising the steps of cooking the raw chips in a heated vegetable oil at potato frying temperature until the chips have reached the desired golden color and before any enzymatic browning action takes place, removing the cooking chips from the oil before their retained moisture content has dropped below 2% and transferring the potatoes directly from the cooking oil to a vacuum chamber and thereafter reducing the moisture content to less than 2% within the vacuum chamber while maintaining a controlled atmospheric temperature less than that at which said browning occurs and a pressure below atmospheric pressure at which noticeable fluffiness of the chip appears.

References Cited

UNITED STATES PATENTS

| | | | |
|---|---|---|---|
| 3,233,333 | 2/1966 | Oppenheimet | 99—207 X |
| 3,353,962 | 11/1967 | Smith | 99—207 X |
| 2,611,705 | 9/1952 | Hendel | 99—100 |
| 3,365,301 | 1/1968 | Lipoma et al. | 99—100 |

FOREIGN PATENTS 1,397,710  3/1965  France.

OTHER REFERENCES

Joslyn et al., Food Processing Operations, 1964, The Avi Publ. Co. Westport, Conn. (page 306).

LIONEL M. SHAPIRO, *Primary Examiner.*

D. M. NAFF, *Assistant Examiner.*

U.S. Cl. X.R.

99—207